UNITED STATES PATENT OFFICE.

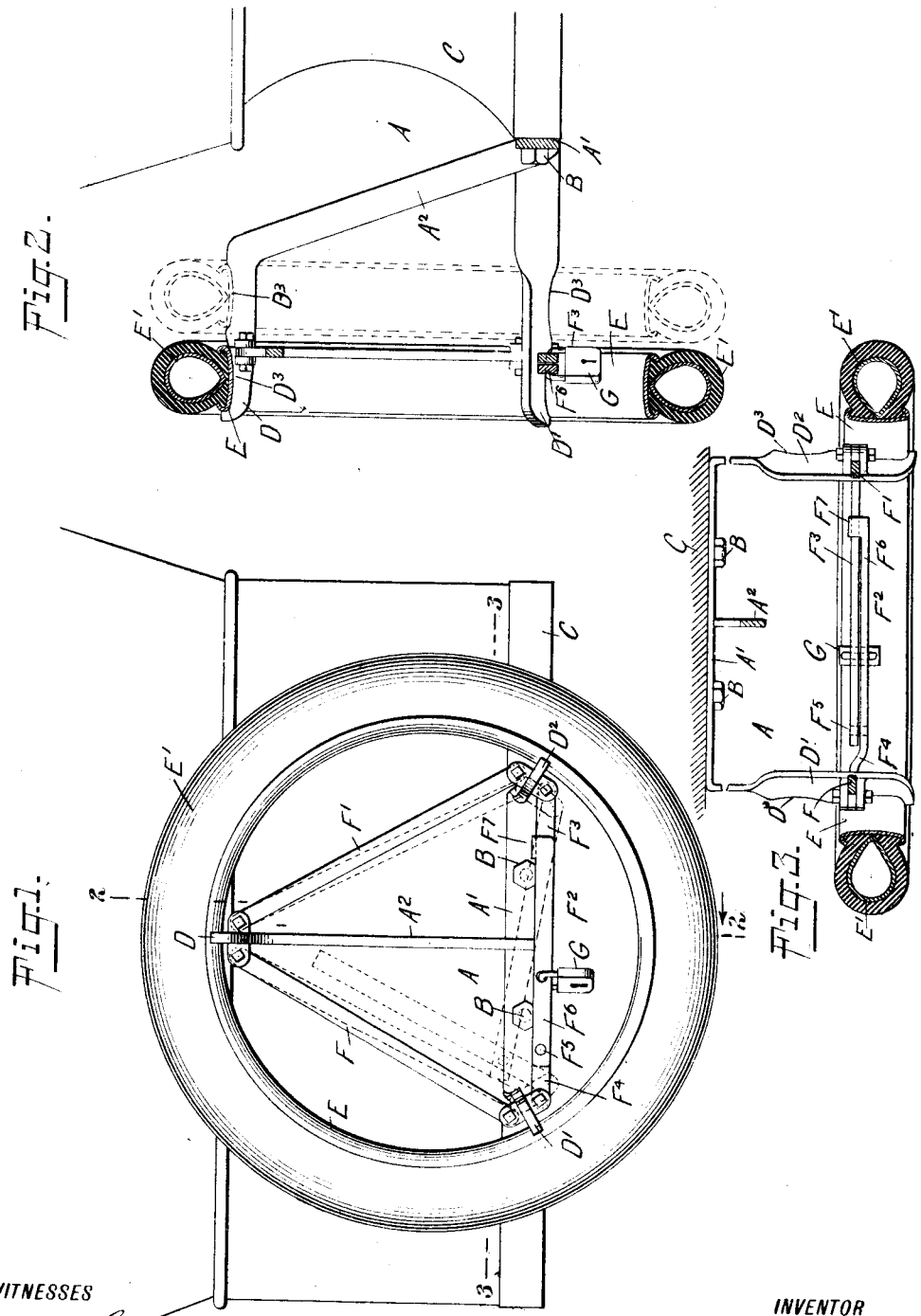

ALEXANDER HARNISHFEGER, OF EVANSVILLE, INDIANA, ASSIGNOR OF ONE-HALF TO MOSES A. STROUSE, OF EVANSVILLE, INDIANA.

TIRE-SUPPORT.

1,062,462. Specification of Letters Patent. Patented May 20, 1913.

Application filed October 11, 1912. Serial No. 725,231.

*To all whom it may concern:*

Be it known that I, ALEXANDER HARNISHFEGER, a citizen of the United States, and a resident of Evansville, in the county of Vanderburg and State of Indiana, have invented a new and Improved Tire-Support, of which the following is a full, clear, and exact description.

The object of the invention is to provide a new and improved tire support or holder for use on the side or rear end of an automobile for safely carrying one or more extra tires held on a demountable rim and arranged to permit of conveniently placing the tire and its rim in position on the support and carrying it safely along, and to allow of removing the tire whenever needed for replacing a worn out or bursted tire.

For the purpose mentioned use is made of supporting means engaging the inner side of the demountable rim to support the latter and its tire, and means for moving the said supporting means outward to clampingly engage the rim, or moving the supporting means inward, or releasing the same to allow of removing the rim and tire from the supporting means.

A practical embodiment of the invention is represented in the accompanying drawings forming a part of this specification, in which similar characters of reference indicate corresponding parts in all the views.

Figure 1 is a side elevation of the tire support as applied and showing a tire in supported position; Fig. 2 is a cross section of the same on the line 2—2 of Fig. 1; and Fig. 3 is a sectional plan view of the same on the line 3—3 of Fig. 1.

The frame or bracket A of the tire support consists of a horizontally-disposed bottom bar A', from the middle of which extends upwardly and forwardly an upright bar A², and the said horizontal bar A' is fastened by bolts B or other fastening means to the sides or rear end of the body of the automobile or other vehicle on which the tire support is to be used. From the upper end of the bar A² extends outwardly and transversely an arm D and similar arms D', D² extend from the ends of the bottom bar A'. The three bars D, D', D² are adapted to be engaged by the inner face of a demountable rim E carrying an inflatable tire E' to support the same, the said transverse arms D, D', D² being arranged at the corners of an approximately equilateral triangle so as to support the rim A at three equidistant points. Each of the bars D, D', D² is preferably provided at the outer edge with one or more recesses or seats D³ (see Figs. 2 and 3) for the rim E to fit in with a view to support the same, or two such rims and their tires E'.

The arms D and D' are connected with each other by links or braces F and a similar link F' pivotally connects the arm D with the arm D², and a link F² connects the arms D' and D² with each other, and this link F² is preferably made in two parts F³, F⁴ pivotally connected with each other by a pin F⁵, as plainly indicated in Figs. 1 and 3. The part F⁴ of the sectional link F² is provided with a handle extension F⁶ terminating in a transverse lug F⁷ adapted to rest on top of the link part F⁸ at the time the sections F³ and F⁴ are in closed or horizontal position, as shown in the drawings. Now when the sectional link F² is in closed position the arms D' and D² are forced in firm contact with the inner face of the rim E with a view to clampingly engage the rim with the three arms D, D' and D², to securely hold the rim and its tire in position on the support. It will be noticed when the parts are in the position described the rim and its tire are held against movement in any direction and consequently the rim and tire are safely supported and are not liable to be lost. Normally the link parts F³ and F⁴ are locked in closed position by a padlock G passing through the handle F⁶ and the part F⁸.

When it is desired to remove the rim E and its tire E' whenever needed for replacing a worn out or a bursted tire, then the operator removes the padlock G and then swings the handle F⁶ of the link part F⁴ upward into the position shown in dotted lines in Fig. 1, whereby the link F² is opened and the arms D' and D² are drawn toward each other out of engagement with the inner face of the rim E to allow of lifting the rim E off the top arm D and away from the other arms D' and D². In a like manner rim E and its tire E' can be placed in position on the arm D, after which the link F² is closed by swinging the handle F⁶ downward until the lug F⁷ rests on the top of the link part F⁸. It is understood that on swinging the handle F⁶ downward the link F² is closed, and in doing so the arms D', D² are moved apart and into firm contact with the inner surface of the rim E to clampingly engage the latter thus holding the rim and its tire securely in position. The padlock G is then replaced to lock the sectional link F² against accidental opening.

The tire support shown and described is very simple and durable in construction, can be readily attached to an automobile or other vehicle and takes up comparatively little room.

It will be noticed that no straps or similar fastening devices are required for fastening the tire in position on the support.

Having thus described my invention, I claim as new and desire to secure by Letters Patent:

1. A support for a tire on a demountable rim, comprising a bracket having a plurality of spaced transversely extending arms adapted to engage the inner face of the rim, and links connecting the arms with each other, one of the links being in sections pivotally connected with each other.

2. A support for a tire on a demountable rim, comprising a bracket having a plurality of spaced transversely extending arms adapted to engage the inner face of the rim, and links connecting the outer ends of the arms with each other, one of the links being in sections pivotally connected with each other, one of the sections having an extension forming a handle for opening or closing the sectional link.

3. A support for a tire on a demountable rim, comprising a bracket having a plurality of spaced transversely extending arms provided with seats for the inner face of the rim to rest in, one of the arms being on top, and links pivotally connecting the outer ends of the said arms with each other, the bottom link being made in sections pivotally connected with each other to allow of opening or closing the bottom link, one of the sections of the bottom link being provided with a handle extension for manipulating the bottom link.

4. A support for a tire held on a demountable rim, comprising a bracket, transverse arms extending from the said bracket and arranged at the corners of an equilateral triangle for engaging the rim at the inner face thereof, and a bottom link pivotally connecting the outer end of the lowermost arms with each other, the said bottom link being made in sections pivotally connected with each other to allow of opening or closing the said bottom link.

5. A support for a tire held on a demountable rim, comprising a bracket having a bottom bar for attachment to a support, an upwardly and outwardly-extending bar projecting from the center of the bottom bar, arms extending transversely from the ends of the said bottom bar, an arm extending from the upper end of the said upwardly and outwardly extending bar, and means for moving the arms at the ends of the bottom bar toward or from each other.

6. A tire support of the character described, comprising a bracket formed of a bottom bar having at each end a projecting arm, a bar extending from the center of the bottom bar and terminating in an arm, said arms being provided with seats to engage the inner face of the rim of a wheel, and links connecting the outer ends of the arms with each other, one of the links being made in sections pivoted together, one of the sections having an extension forming a handle.

In testimony whereof I have signed my name to this specification in the presence of two subscribing witnesses.

ALEXANDER HARNISHFEGER.

Witnesses:
   JOHN D. WELMAN,
   PHILIP W. FREY.